(12) United States Patent
Baron

(10) Patent No.: US 9,162,727 B2
(45) Date of Patent: Oct. 20, 2015

(54) TRICYCLE VEHICLE HAVING A SWIVEL WHEEL AND A CART

(75) Inventor: Yoram Baron, Moshav Nir Israel (IL)

(73) Assignee: SMART TRIKE MNF PTE LTD., Singapore (SG)

(*) Notice: Subject to any disclaimer, the term of this patent is extended or adjusted under 35 U.S.C. 154(b) by 0 days.

(21) Appl. No.: 14/127,657

(22) PCT Filed: Aug. 9, 2012

(86) PCT No.: PCT/IB2012/054071
§ 371 (c)(1),
(2), (4) Date: Dec. 19, 2013

(87) PCT Pub. No.: WO2013/024407
PCT Pub. Date: Feb. 21, 2013

(65) Prior Publication Data
US 2014/0138932 A1   May 22, 2014

Related U.S. Application Data

(60) Provisional application No. 61/523,215, filed on Aug. 12, 2011.

(51) Int. Cl.
*B62K 9/02* (2006.01)
*B62K 13/00* (2006.01)
(Continued)

(52) U.S. Cl.
CPC . *B62K 21/18* (2013.01); *B62B 7/12* (2013.01); *B62D 1/12* (2013.01); *B62H 7/00* (2013.01); *B62J 9/00* (2013.01); *B62K 5/02* (2013.01); *B62K 9/02* (2013.01); *B62K 13/00* (2013.01); *B62K 13/08* (2013.01); *B62K 21/00* (2013.01);
(Continued)

(58) Field of Classification Search
CPC .......... B62K 9/02; B62K 21/02; B62K 21/18; B62K 21/14; B62K 13/00; B62K 13/04; B62K 13/08
USPC ............... 280/7.1, 7.15, 47.18, 279, 643, 648
See application file for complete search history.

(56) References Cited

U.S. PATENT DOCUMENTS 1,218,943 A * 3/1917 Hudry .......................... 280/7.17
1,274,045 A * 7/1918 Hudry .......................... 280/7.15
(Continued)

FOREIGN PATENT DOCUMENTS

| CN | 2405850 | 11/2000 |
|---|---|---|
| CN | 1120783 | 7/2001 |

(Continued)

OTHER PUBLICATIONS

International Search Report and Opinion for PCT/IB2012/05407—16 pages—mailed Feb. 8, 2013.

*Primary Examiner* — Joseph Rocca
*Assistant Examiner* — Maurice Williams
(74) *Attorney, Agent, or Firm* — Boach Brown McCarthy & Gruber, P.C.; Kevin D. McCarthy

(57) ABSTRACT

The present invention discloses a tricycle vehicle having a cart. According to the invention the tricycle vehicle includes a riding module (101) having a front wheel (102), a steering assembly (107) and a frame (105) having a rear tube. The tricycle vehicle also includes a cart module (103) having two wheels (104), a body (111) configured to carry a bag, a base having a base frame and a handle (112) configured for steering the tricycle vehicle.

10 Claims, 19 Drawing Sheets

(51) Int. Cl.
| | |
|---|---|
| *B62K 13/08* | (2006.01) |
| *B62K 21/02* | (2006.01) |
| *B62K 21/18* | (2006.01) |
| *B62K 21/24* | (2006.01) |
| *B62D 1/12* | (2006.01) |
| *B62H 7/00* | (2006.01) |
| *B62J 9/00* | (2006.01) |
| *B62M 1/38* | (2013.01) |
| *B62K 27/00* | (2006.01) |
| *B62K 21/00* | (2006.01) |
| *B62K 5/02* | (2013.01) |
| *B62M 6/00* | (2010.01) |
| *B62K 21/08* | (2006.01) |
| *B62B 5/00* | (2006.01) |
| *B62B 7/12* | (2006.01) |

(52) U.S. Cl.
CPC ............... *B62K 21/02* (2013.01); *B62K 21/08* (2013.01); *B62K 21/24* (2013.01); *B62K 27/003* (2013.01); *B62M 1/38* (2013.01); *B62M 6/00* (2013.01); *B62B 5/0079* (2013.01); *B62B 7/126* (2013.01); *B62B 2202/26* (2013.01); *B62B 2206/006* (2013.01)

(56) References Cited

U.S. PATENT DOCUMENTS

| | | | |
|---|---|---|---|
| 1,449,255 A * | 3/1923 | Abrahams et al. | 280/7.1 |
| 1,484,876 A * | 2/1924 | Dobrowolski | 280/202 |
| 1,606,269 A * | 11/1926 | Stack | 280/7.15 |
| 2,202,479 A | 5/1940 | Bullock | |
| 2,453,631 A * | 11/1948 | Leser et al. | 280/47.35 |
| 2,504,907 A * | 4/1950 | Truran | 414/457 |
| 2,565,848 A * | 8/1951 | Howard | 280/87.05 |
| 2,630,334 A * | 3/1953 | Ewers | 280/288.4 |
| 2,672,351 A | 3/1954 | Kane | |
| 2,683,480 A * | 7/1954 | Kosman | 280/7.1 |
| 3,152,838 A * | 10/1964 | Morehead | 298/17 R |
| 3,190,676 A | 6/1965 | Junge | |
| 3,354,975 A * | 11/1967 | Stuart | 180/208 |
| 3,485,507 A | 12/1969 | Christof | |
| 3,658,354 A * | 4/1972 | Read | 280/7.15 |
| 3,664,683 A * | 5/1972 | Gobby | 280/202 |
| 3,724,873 A * | 4/1973 | Glamb et al. | 280/203 |
| 3,863,472 A | 2/1975 | Klingfus | |
| 4,714,261 A | 12/1987 | Kassai | |
| 4,865,337 A * | 9/1989 | Disler et al. | 280/7.1 |
| 4,895,379 A * | 1/1990 | Kelly | 280/7.1 |
| 5,011,133 A | 4/1991 | Myers | |
| 5,028,066 A | 7/1991 | Garth | |
| 5,085,063 A | 2/1992 | Van Dyke | |
| 5,279,181 A * | 1/1994 | Boudreau | 74/551.1 |
| 5,356,197 A * | 10/1994 | Simic | 297/129 |
| 5,499,834 A | 3/1996 | Pasin | |
| 6,082,754 A | 7/2000 | Jeunet | |
| 6,120,048 A | 9/2000 | Li | |
| 6,149,178 A | 11/2000 | Bradbury | |
| 6,302,421 B1 * | 10/2001 | Lee | 280/210 |
| 6,343,806 B1 | 2/2002 | Lee | |
| 6,378,884 B1 | 4/2002 | Kettler | |
| 6,443,469 B1 | 9/2002 | Cross | |
| 6,530,589 B1 | 3/2003 | Ma | |
| 6,612,598 B2 | 9/2003 | Wu | |
| 6,666,470 B2 | 12/2003 | Li | |
| 6,685,206 B1 * | 2/2004 | Blake | 280/278 |
| 6,685,207 B1 * | 2/2004 | Blake | 280/282 |
| 6,688,633 B2 | 2/2004 | van't Schip | |
| 6,799,772 B2 | 10/2004 | Kettler | |
| 6,811,172 B2 | 11/2004 | Yen | |
| 6,811,173 B1 | 11/2004 | Shih | |
| 6,840,527 B1 | 1/2005 | Michelau | |
| 6,874,802 B2 | 4/2005 | Gunter | |
| 6,908,091 B2 | 6/2005 | Chuang | |
| 6,916,028 B2 * | 7/2005 | Shapiro | 280/47.34 |
| 7,000,935 B2 * | 2/2006 | Gunter et al. | 280/272 |
| 7,044,491 B2 | 5/2006 | Kettler | |
| 7,246,809 B2 | 7/2007 | Rutkowski | |
| 7,261,308 B2 * | 8/2007 | Gwisdalla et al. | 280/212 |
| 7,281,725 B1 | 10/2007 | Gunter | |
| 7,347,071 B2 | 3/2008 | Nakai | |
| 7,549,661 B2 * | 6/2009 | Jackson et al. | 280/204 |
| 7,614,633 B2 | 11/2009 | Goring | |
| 7,625,002 B2 * | 12/2009 | Huang | 280/272 |
| 7,914,030 B2 * | 3/2011 | Ehrenreich et al. | 280/264 |
| 8,439,385 B2 * | 5/2013 | Baron | 280/288.4 |
| 8,465,037 B2 * | 6/2013 | Baron | 280/240 |
| 8,602,432 B2 * | 12/2013 | Baron | 280/240 |
| 8,740,235 B2 * | 6/2014 | Baron | 280/240 |
| 8,764,041 B1 * | 7/2014 | Baron | 280/288.4 |
| 2002/0089144 A1 | 7/2002 | Kettler | |
| 2003/0014169 A1 | 1/2003 | Kato | |
| 2003/0132596 A1 * | 7/2003 | Li | 280/263 |
| 2003/0201621 A1 | 10/2003 | Jang | |
| 2004/0164515 A1 * | 8/2004 | Gunter et al. | 280/293 |
| 2006/0035760 A1 * | 2/2006 | Hill | 482/57 |
| 2009/0108558 A1 * | 4/2009 | Kettler et al. | 280/279 |
| 2011/0074125 A1 | 3/2011 | Aiken | |
| 2011/0278815 A1 * | 11/2011 | Khare et al. | 280/279 |

FOREIGN PATENT DOCUMENTS

| | | | | |
|---|---|---|---|---|
| CN | 1303800 | | 7/2001 | |
| CN | 101691130 | | 4/2010 | |
| CN | 201825196 | | 5/2011 | |
| DE | 1902754 | * | 1/1969 | .......... B60N 2/2848 |
| DE | 1902754 A1 | | 8/1970 | |
| DE | 9105305 | * | 8/1991 | ............. B62K 9/02 |
| DE | 29822875 | | 5/2000 | |
| DE | 102005002216 | | 7/2006 | |
| DE | 102005002216 A1 | * | 7/2006 | ............... B62B 7/12 |
| EP | 839706 | | 5/1998 | |
| EP | 1048559 | | 11/2000 | |
| EP | 1048559 A1 | | 11/2000 | |
| FR | 891173 | * | 2/1944 | ........... B62K 13/04 |
| FR | 2187592 | | 1/1974 | |
| FR | 2883834 | | 10/2006 | |
| FR | 2883834 A1 | * | 10/2006 | ........... B62K 13/00 |
| FR | 2930929 | | 11/2009 | |
| FR | 2930929 A1 | | 11/2009 | |
| FR | 2955080 | | 7/2011 | |
| FR | 2955080 A1 | | 7/2011 | |
| GB | 908184 | * | 9/1948 | ............... B62B 7/12 |
| GB | 908184 | | 10/1962 | |
| GB | 1422409 | | 1/1976 | |
| GB | 2387823 | | 10/2003 | |
| GB | 2387823 A | * | 10/2003 | ............... B62K 1/00 |
| JP | 2001-247072 | | 9/2001 | |
| JP | 2001-315681 | | 11/2001 | |
| JP | 2006-298161 | | 11/2006 | |
| KR | 2009-0101808 | | 9/2009 | |
| NL | 1023930 | | 1/2005 | |
| WO | 2004067352 | | 8/2004 | |
| WO | WO 2004067352 A1 | * | 8/2004 | ............... B62B 7/12 |
| WO | 2008102023 | | 8/2008 | |
| WO | WO 2008102023 A1 | * | 8/2008 | ............... B62B 7/12 |

\* cited by examiner

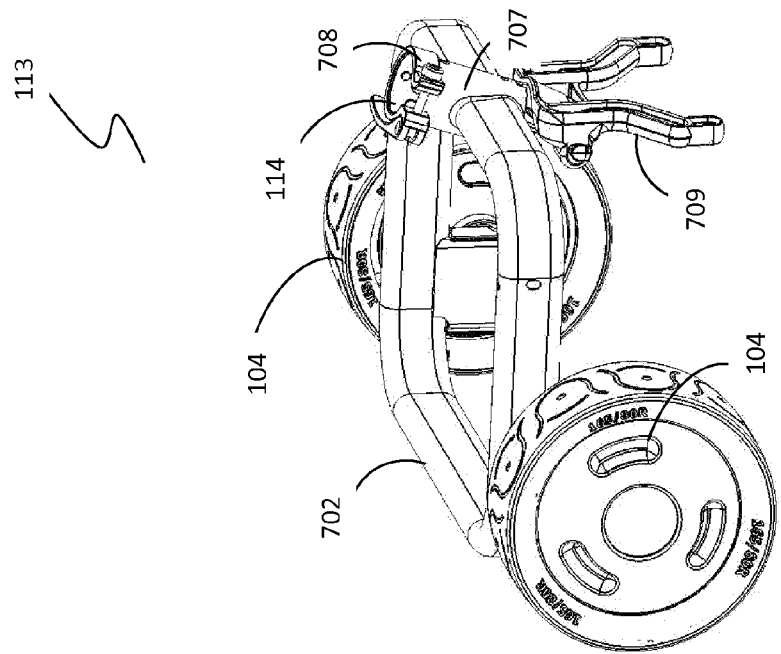
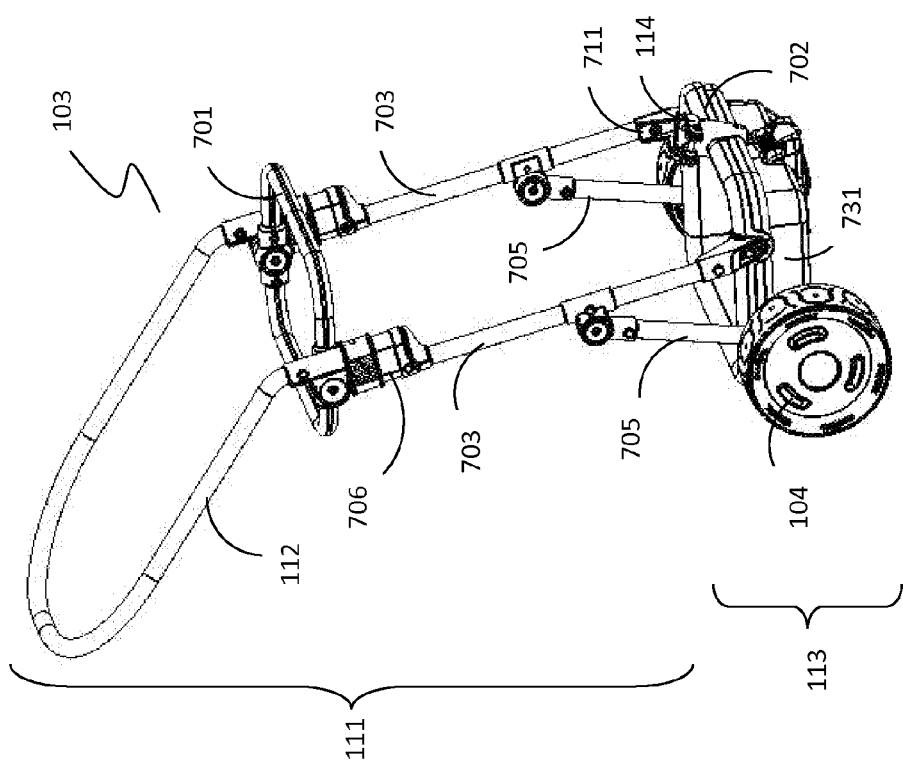
Fig. 1C
Fig. 1B

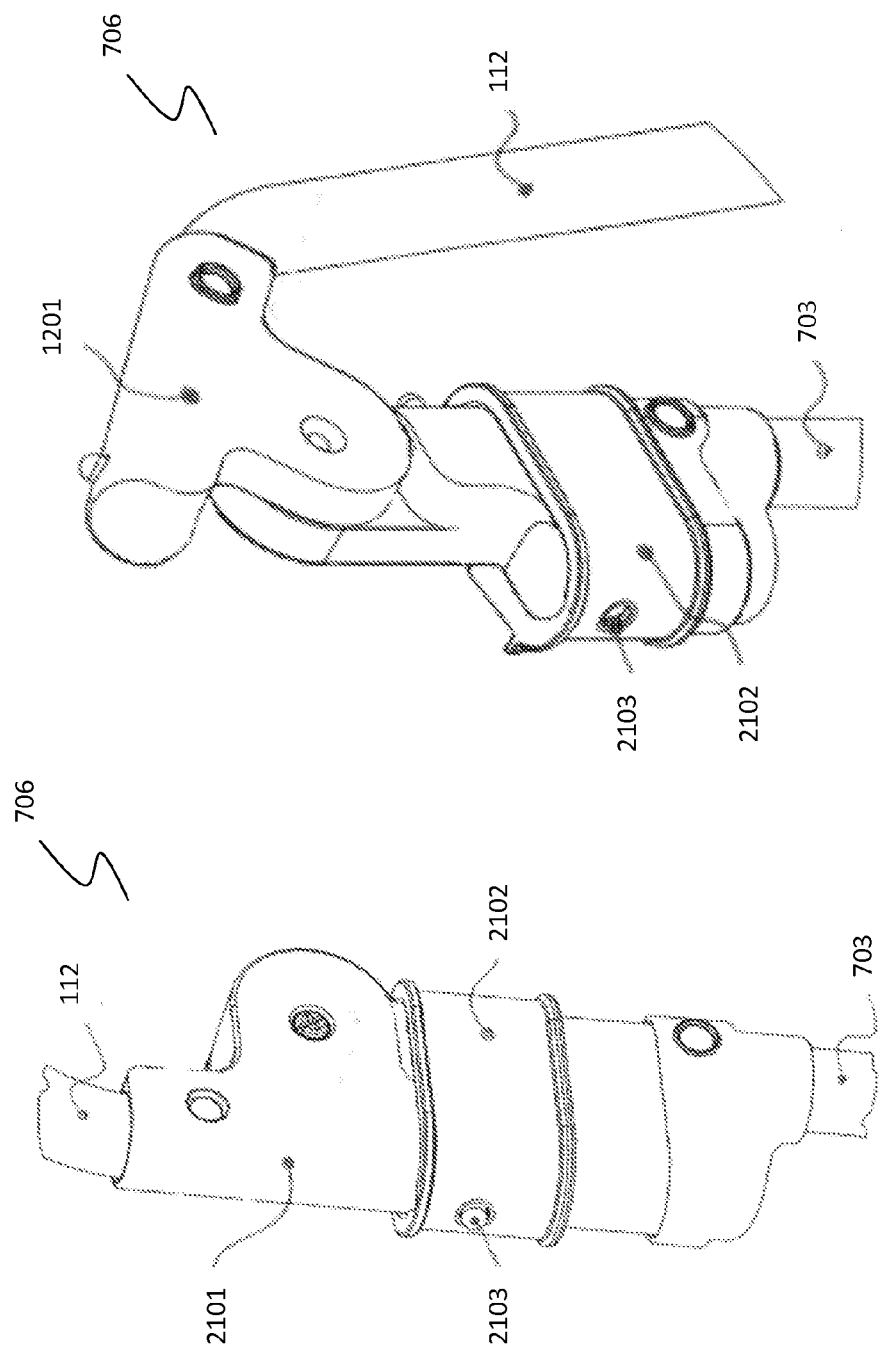

TRICYCLE VEHICLE HAVING A SWIVEL WHEEL AND A CART

REFERENCE TO CO-PENDING APPLICATIONS

Priority is claimed as a 371 of international application number PCT/IB2012/054071, filed on Aug. 9, 2012; which claims priority to U.S. provisional patent application Ser. No. 61523215, filed on Aug. 12, 2011.

TECHNICAL FIELD

The invention relates to tricycle vehicles.

BACKGROUND

Whether used for transportation or recreation, tricycles may be used for riders of different sizes and capabilities. Some tricycles are configured to be propelled and steered by the rider. In some instances, tricycles are configured to be pushed from behind, by an individual, such as an adult pushing a child. Typically, when the tricycle is propelled by the rider, the rider uses the pedals attached to the front wheel and steers the tricycle using a handle which is typically connected to the front wheel. Tricycles configured to be pushed from behind sometimes include a mechanical steering mechanism to permit an adult walking behind the tricycle to mechanically turn the front wheel.

SUMMARY

It is therefore an object of the invention to provide a tricycle vehicle having a cart, allowing parental control over the tricycle.

The invention generally relates to a tricycle having a cart, comprising:

1. a riding module having: (a) a front wheel having a front wheel axis; (b) a pair of pedals, each pedal configured to rotate said front wheel; (c) a head tube; (d) a seat; (e) a frame, configured to support said seat, and to support said head tube; (f) a fork having at least one blade configured to support said front wheel in a manner permitting said front wheel to rotate about said front wheel axis; (g) a stem configured to rotatably extend from said head tube wherein said stem extends from said fork at an angle chosen so that said stem axis can lead said front wheel axis in the external steerable mode; (h) a steering assembly, having a rider handle, configured to turn said fork about a stem axis, said rider handle, in the rider steerable mode, being configured to be rotationally coupled with said stem in a manner permitting a tricycle rider to exert forces on said rider handle and thereby turn said fork, and said rider handle in said external steerable mode, being configured to be rotationally uncoupled from said stem, preventing forces on said rider handle from turning said fork; and 2. a cart module having: (i) two wheels; (j) a handle for moving said cart module; (k) a body configured to carry a bag; (l) a base having a base frame; (m) an attaching assembly capable of coupling to said riding module.

Preferably, the cart module is foldable.

Preferably, cart module can be disconnected from said riding module.

Preferably, disconnected cart is carryable.

Preferably, the fork includes two blades configured to rotatably support the front wheel therebetween.

Preferably, the handle is configured to be uncoupled from the stem via a manually activatable release mechanism.

Preferably, the handle is configured to be coupled to the stem via a snap-in-place mechanism.

Preferably, the tricycle further comprises a coupling mechanism associated with the stem, for permitting an operator to selectively couple and uncouple a rotational connection between the handle and the stem.

Preferably, the coupling mechanism is configured such that in the external steerable mode, the rider handle is freely rotatable independent of the stem, and in the rider steerable mode the rider handle is coupled to the stem for rotation with the stem.

The invention may also relate to a wheel turning mechanism for turning a front wheel of a tricycle vehicle, comprising: (a) two non-continuing recessed members, each in the form of an arch having two ends, substantially in the perimeter of a tube; (b) a guide configured to rotate within the recessed members, rotating within the recessed members is limited by said two ends of each recessed member; (c) a supporting structure holding the tube; (d) a pressure transferring element non-rotationally fixed within said supporting structure, said pressure transferring element being coupled to said guide, pushing the guide into one of said recessed members; and (e) said pressure transferring element is configured to respond to pressure by releasing said guide from said one of said recessed members.

BRIEF DESCRIPTION OF THE DRAWINGS

In the drawings:

FIG. 1B presents a general view of a cart module of the tricycle, according to one embodiment of the invention.

FIG. 1C presents an enlarged view of the cart module's base, according to certain embodiments.

FIG. 1D presents a folding mechanism in the unfolded mode, according to one embodiment of the invention.

FIG. 1E presents a folding mechanism while folding, according to one embodiment of the invention.

DETAILED DESCRIPTION OF EMBODIMENTS

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

In addition, unless specifically noted, embodiments described or referenced in the present description can be additional and/or alternative to any other embodiment described or referenced therein.

The terms "tricycle" and "tricycle vehicle" may be used hereinafter interchangeably.

Figure 1A:
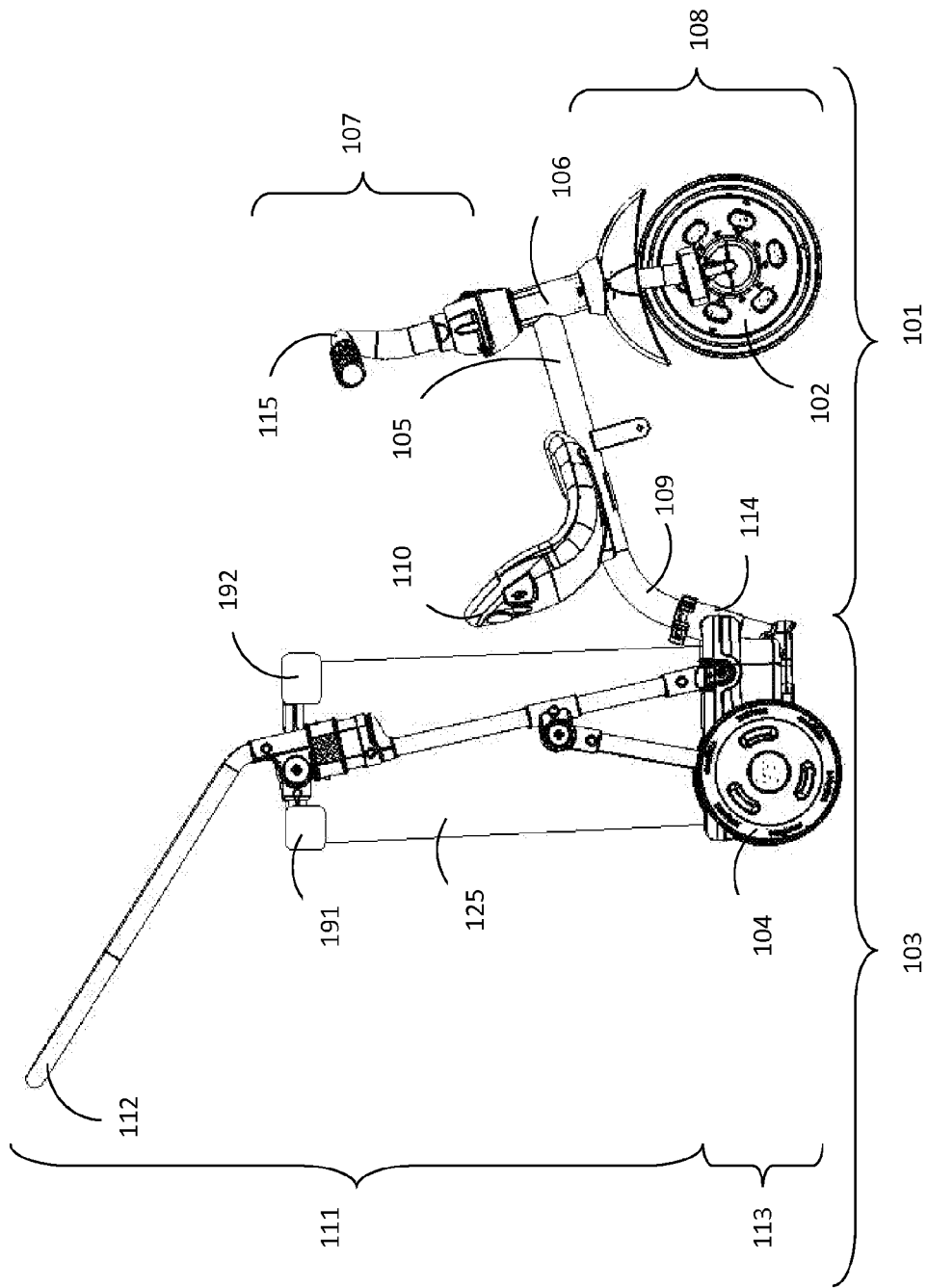
FIG. 1A presents a general view of a tricycle vehicle having a cart, according to one embodiment of the invention.

FIG. 1A presents a general view of a tricycle, constituting shortly "tricycle", having a cart according to one embodiment of the invention. The tricycle is composed of two modules: a riding module 101, having a front wheel 102 of the tricycle, and a cart module 103, having two wheels 104 (one of the wheels is hidden behind the other) which are the rear wheels of the tricycle. Being attached, the two modules 101 and 103 form together a tricycle with a cart.

In one embodiment the riding module and the cart module are detachably attached. However, this is non-limiting and in other embodiments they may be permanently attached one to the other, while in yet other embodiments they may be manufactured and sold when detached, but upon attachment they may become inseparable.

The riding module 101 of the tricycle has a frame 105. A front tube 106 of the frame 105 serves for attachment of a steering assembly 107 and a wheel assembly 108. The steering assembly 107 may comprise handlebars 115. A rear tube 109 of the frame 105 serves for attachment of the cart module 103. A seat 110 may be mountable on the frame 105.

The cart module 103 of the tricycle is composed from a body 111 and from a base 113. The body may be configured to carry a bag such as bag 125 and may include a handle 112. The bag may be held by Velcro straps 191 and 192 or by any other means. The base 113, in turn may have an attaching assembly 114 mounted thereon for attaching the tube 109. In other embodiments, the attaching assembly may be included in the base instead of being mounted thereon.

According to this embodiment, the two modules of the tricycle, 101 and 103, are attached by means of inserting and locking the rear frame tube 109 of the riding module 101 inside the attaching assembly 114 of the cart module 103. However, this is non-limiting and any other attaching mechanism may be used for attaching the two modules together, such as an opposite mechanism in which the attaching assembly 114 is inserted into the rear frame tube 109. Another possible non limiting locking mechanism is a mechanism using a locking pin.

FIG. 1B presents a general view of the cart module 103 of the tricycle without the bag, according to one embodiment of the invention. The cart module 103 of the tricycle is composed from a body 111 and a base 113.

The base 113 of the cart module 103 may have a base frame 702 and a bottom base 731 attached to it. The bottom base 731 may be used for supporting the bag from below. Nevertheless, in other embodiments the base frame 702 may not have a bottom base 731. An attaching assembly 114 is mounted on the front of the base frame, while two wheels 104 are mounted on the sides thereof.

The body 111 may comprise a handle 112, an upper frame 701 and two side poles 703. A bag (not shown) may be attached to the upper frame 701, using Velcro or any other known attaching means. A bottom base 731 may be attached to base frame 702 for supporting the bottom of the bag. In some embodiments the bag may be attached to the base frame 702 and/or to the bottom base 731 and/or to the upper frame 701.

According to an embodiment, the side poles 703 may be connected at their upper ends to the upper frame 701 and may be connected to the handle 112. The handle may be connected to the upper frame 701 as well. In an embodiment that allows folding the cart module 103, the handle may be connected to the poles and to the upper frame by means of a folding mechanism 706 (see FIGS. 1D, 1E, and 1F). The side poles 703, may be attach at their bottom to the base frame 702 via a connecting element 711 which may allow the detaching of the poles and hence the body 111 from the base frame 702. The side poles 703 may be held by rear legs 705 for stability and support which may also be attached to the base frame 702 in addition to being attached to the side poles 703. The rear legs 705 and/or the side poles 703 may be attached thereto by any means known per se, including screws, a detachable spring mechanism etc. The handle 112 may be used for towing the two-wheeled cart module and for pulling or carrying it, for example into the house.

The described cart module is non-limiting, and according to the invention other cart modules may be attached to a tricycle instead. For example, there may be a cart having a different number of poles, e.g., four. Moreover, instead of using poles for holding the upper frame, usable, in turn, for holding the bag, it is possible to have a cart module using other constructs.

Furthermore, the bag in the cart module is removable. This is non-mandatory and other embodiments may have a permanently attached bag.

FIG. 1C depicts an enlarged view of the cart module's base 113, according to an embodiment. The base 113 is depicted here together with the wheels 104 and the attaching assembly 114 mounted thereon. The attaching assembly 114 includes a front tube 707 with a ring lock 708 and a supporting stand 709 with two legs. The supporting stand 709 is useable for supporting the cart module. In other embodiments, instead of having two supporting legs that are part of an attaching assembly it is possible to have any number of any type of supporting legs, for example, one or two retractable stands, such as the stand used for stabilizing a motorcycle, etc. The legs of the supporting stand 709, or any alternative supporting mechanism used instead, may be folded for easy travel or unfolded for supporting the cart module 103 to stand on the ground, in an upward position.

When attaching the base 113 to the riding module 101, as described in relations to FIG. 1, the rear tube 109 of the riding module's frame 105 is inserted into the front tube 707 of the attaching assembly 114, whereupon the ring lock 708 may be used for locking the rear tube 109 inside the front tube 707. Similarly, detaching the cart module may be performed by unlocking the ring lock 708 and pulling the rear tube 109 of the frame 105 out of the front tube 707. Yet, this is non-limiting and any other attaching mechanism may be used for attaching and detaching the two modules, and for locking/ unlocking them one to the other, for example using screws. Therefore, the ring lock 708 may generally constitute a "base locking mechanism", and so does any alternative mechanism used for locking the base 113 to the riding module 101.

FIGS. 1D and 1E depict an enlarged view of the folding mechanism 706, according to one embodiment of the invention. FIG. 1D illustrates the mechanism while the cart is unfolded, while FIG. 1E depicts the same mechanism in the folded position. The folding mechanism may include a locking element 2101 and a ring element 2102. The ring element has a push button 2103 that is supported, according to some embodiments, by a spring. When the handle 706 is unfolded, the ring element 2102 encloses the lower end of the locking element 2101, hence preventing it from rotating.

When pushing the protruding pin 2103, the ring element 2102 may be slided down to its lower position, thus releasing the locking element 2101 to rotate. Upon rotating the locking element 2101, the handle 112 rotates downwards for folding. According to some embodiments whereupon the upper frame 701 is also coupled to the locking element 2101, the rotation thereof may result in the rotation of the upper frame as well, and hence the folding thereof as well to a vertical position. The described folding mechanism is non-limiting and other folding mechanisms may be used as well.

Figure 1F:
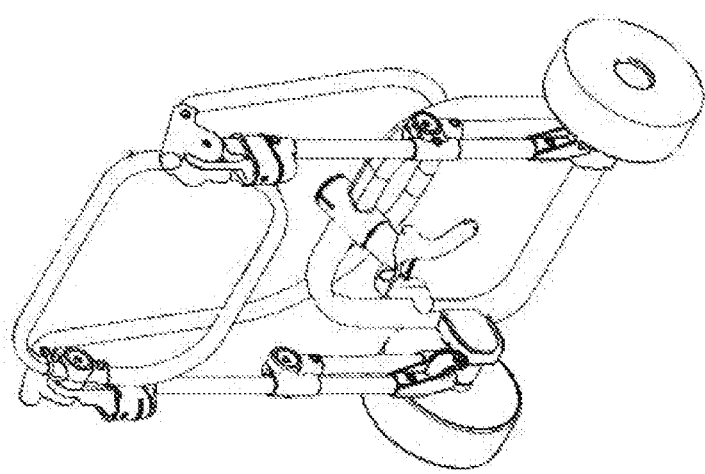
FIG. 1F illustrates a folded cart module, according to one embodiment.

The folded cart module according to one embodiment is illustrated in FIG. 1F. In one embodiment, a screw driver may be needed in order to release screws for folding the cart module. In other embodiments, snap-ins or other connecting elements may be used in the cart module in addition to the screws or instead of the screws.

Figure 1G:
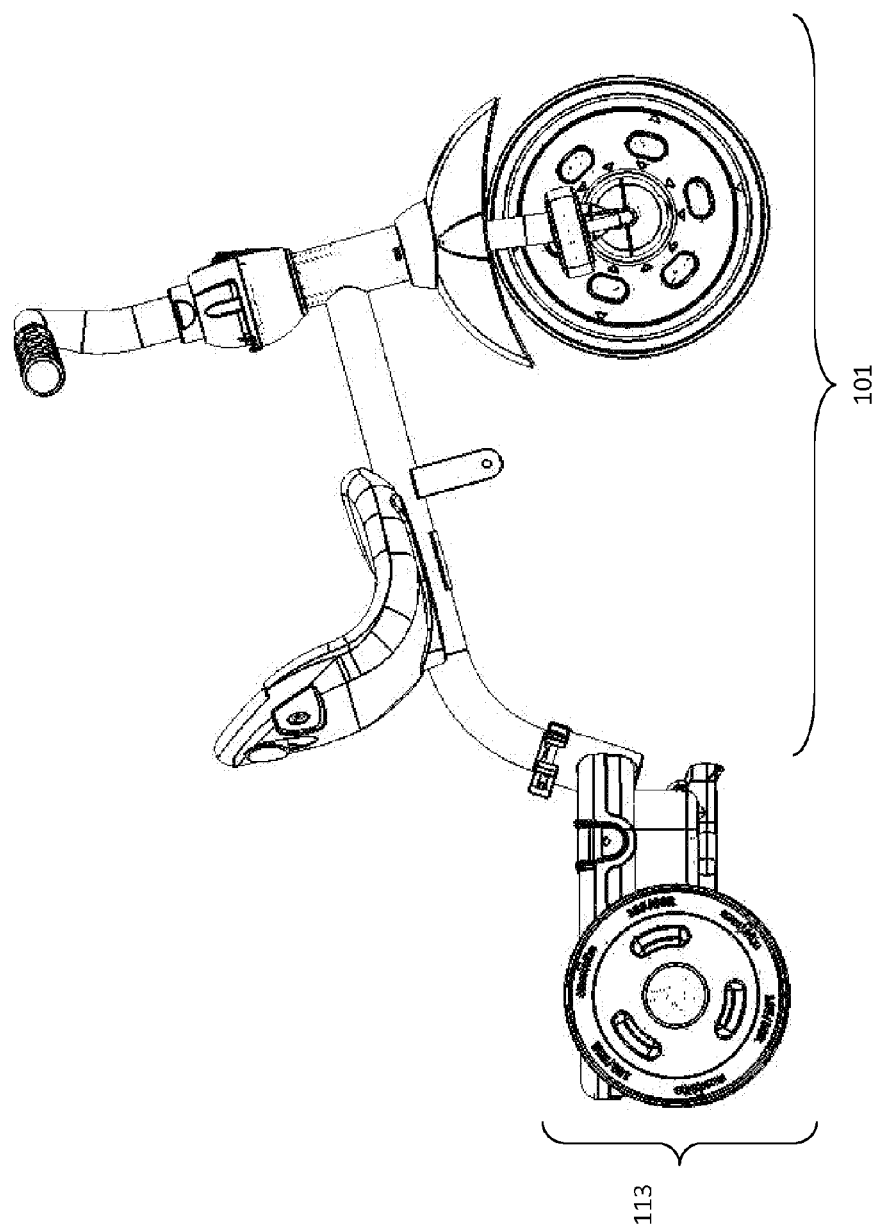
FIG. 1G presents the cart module's base when attached to the riding module, according to certain embodiments.

FIG. 1G presents the cart module's base 113 when attached to the riding module 101, according to one embodiment.

As described above, the cart module can be attached and detached from the riding module, with or without the cart module's body 111. According to an embodiment of the invention the cart module can be coupled to the riding module, either by using a one-time coupling mechanism or by having a base frame which is a direct continuation of the rear tube, that is: the rear tube and the base frame are one piece. Thus in some embodiments the described tricycle with a cart may be converted to a tricycle with a carrier, where the carrier may be used for carrying small things such as a doll or a bottle.

According to an embodiment the cart's body can be folded and unfolded.

The described tricycle may have two modes of operation: rider-steerable and externally- steerable. In the rider-steerable mode the front wheel 102, as described in relations to FIG. 1A, is under a control of the steering assembly 107. Meaning that the steering assembly 107 may be configured to be rotationally coupled with the front wheel 102 in a manner permitting a tricycle rider to exert forces on the steering assembly 107 and thereby turn the front wheel 102. In this mode the tricycle may be steered by the rider holding handlebars 115, which are a part of the steering assembly.

In the externally-steerable mode the front wheel 102, as described in relations to FIG. 1A, is not controlled by the steering assembly 107, instead it is free to swivel. In this mode the tricycle is steered externally by a person standing behind or beside the tricycle, using the handle 112 of the cart module 103. In other words, steering assembly 107, in the externally-steerable mode, may be configured to be rotationally uncoupled from the front wheel 102, effectively preventing forces on the steering assembly 107 from turning the front wheel 102 and allowing the tricycle to be steered externally.

The free front wheel 102 may behave as a caster, i.e. it swivels to follow the direction in which the tricycle is pushed or pulled.

The conversion of the tricycle between the externally-steerable and the rider-steerable modes may be performed, according to an embodiment, by coupling and uncoupling, respectively, the steering assembly 107 to the wheel assembly 108.

Figure 2:
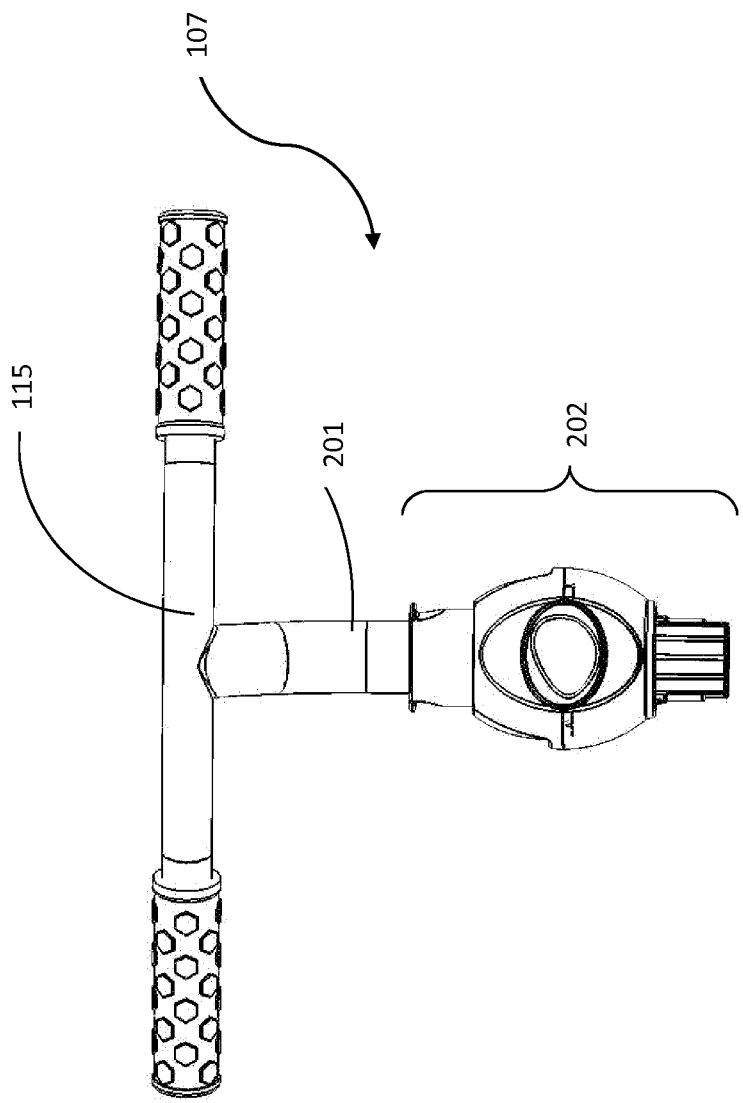
FIG. 2 is a front view of the steering assembly of the rider module of a tricycle, according to one embodiment of the invention.

FIG. 2 is a front view of the steering assembly of the rider module of a tricycle, according to one embodiment of the invention. The steering assembly 107 is composed of the handlebars 115, a steering arm 201 connected to the handlebars 115, and a coupling mechanism 202, connected to the steering arm 201. The coupling mechanism may be configurable for coupling and uncoupling the steering assembly 107 to the wheel assembly 108. While in the present embodiment the coupling mechanism is part of the steering assembly and it is useable for coupling the wheel assembly, in alternative embodiments the coupling mechanism may be part of the wheel assembly, useable for coupling the steering assembly thereto. Moreover, it can be part of the frame, while being usable for coupling the steering assembly 107 to the wheel assembly 108, and for coupling the coupled assemblies to the frame.

Figure 3:
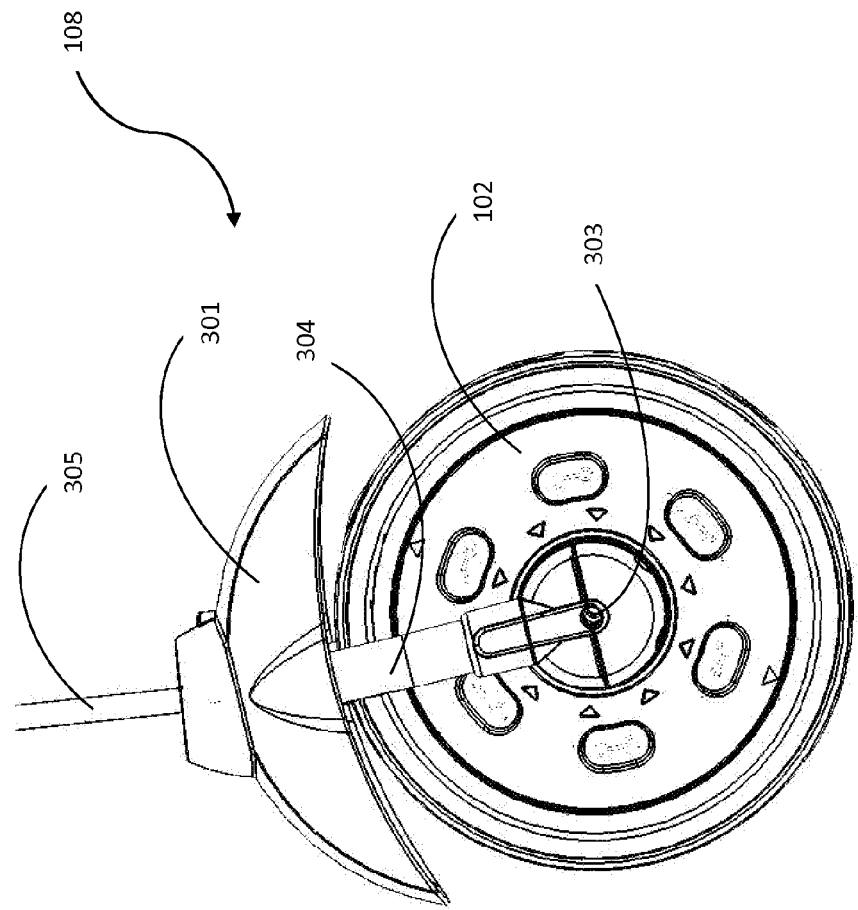
FIG. 3 presents a side view of the wheel assembly of the rider module of a tricycle, according to one embodiment of the invention.

FIG. 3 presents a side view of the wheel assembly 108 of the rider module of a tricycle, according to one embodiment of the invention. The wheel assembly 108 may have a mud-shield 301, a front wheel 102, two pedals (not shown) and a fork 304. The two pedals (not shown) are attached to a horizontal axle 303 of the front wheel 102. The two lower edges of the fork 304 may be pivotally attached to the horizontal axle 303 of the front wheel 102. A stem of the fork may constitute a pivot 305. The figure though is non-limiting and alternatives may exist. For example, a wheel assembly may exist without a mud-shield 301.

Figure 4A:
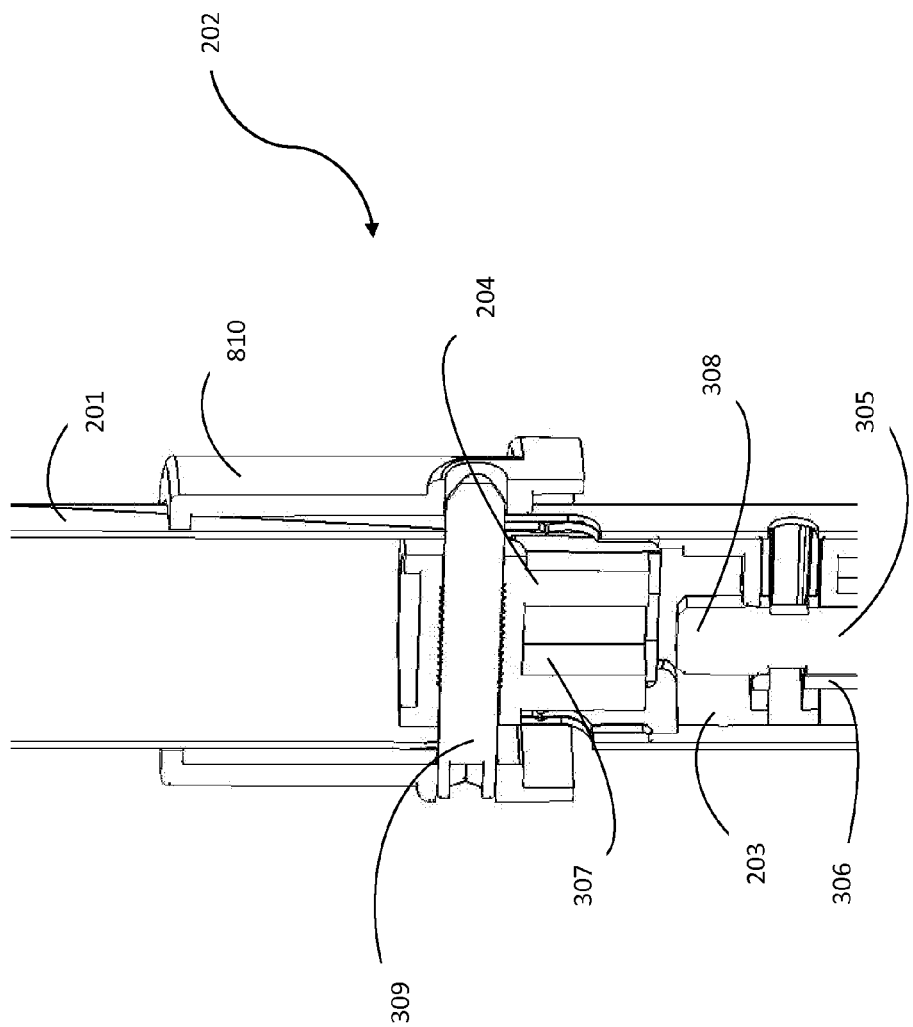
FIG. 4A schematically presents the coupling mechanism according to one embodiment of the invention.

FIG. 4A schematically presents the coupling mechanism 202 according to one embodiment of the invention. The mechanism allows coupling of the steering arm 201 and the pivot 305. It includes three members, namely, a first coupling member 203, a second coupling member 204 and a third coupling member 810.

The first coupling member 203 is statically coupled to the steering arm 201, thereinside. In the middle of the first coupling member there is a shaft 306 through which the pivot 305 can be inserted.

Figure 5:
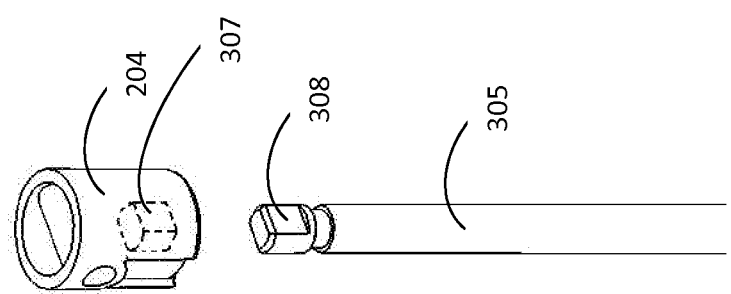
FIG. 5 is a schematic representation of a pivot's top end in correspondence to the second coupling member's opening, according to certain embodiments of the invention.

The second coupling member 204 is positioned inside the top end of the first coupling member, being slideable up and down. In the bottom of the second coupling member there is an opening 307 into which the top end 308 of the pivot 305 may fit. When the second coupling member is in its upper position, it is disconnected from the pivot. Upon sliding down the second coupling member 204, the pivot 305 may be inserted into the opening 307, and a coupling is achieved between the second coupling member 204 and the pivot 305, and hence also between the steering arm and the front wheel. In order to affix the pivot inside the second coupling member's opening, the pivot has a non-round shape in its top end and the opening has a corresponding shape thereto, as illustrated in FIG. 5 in a non-limiting way.

As described above, the second coupling member 204 can be driven up and down inside the steering arm, nevertheless, the second coupling member may be controlled from the outside of the steering arm's tube by the third coupling member 810. Being external to the steering arm's tube and connected to the second coupling member, e.g., by a connecting element 309 such as a pin, a screw, or any other element, the moving of the third coupling member up and down can move the second coupling member. In one embodiment, the connecting element 309 may be considered as part of the third coupling member. Moreover, the third coupling member 810 as depicted in the figure may provide the user a better grip and easier control on the second coupling member's position (whether up or down). That is, it may behave like a handle or a knob. However, in other embodiments the "knob" is redundant or not required, and then, the connecting element alone may be used as the third coupling member.

The connecting element 309 has been presented so far as a single element, such as pin etc, connecting both sides of the third coupling member via the steering arm and the second coupling member. This is not mandatory though and in other embodiments other solutions can be applied instead. For example, by having a third coupling member composed of two parts (e.g., a "right part" and a "left part"), a short pin can be coupled to each part, while the short pin can penetrate the steering arm and form the connection with the second coupling member.

Figure 4B:
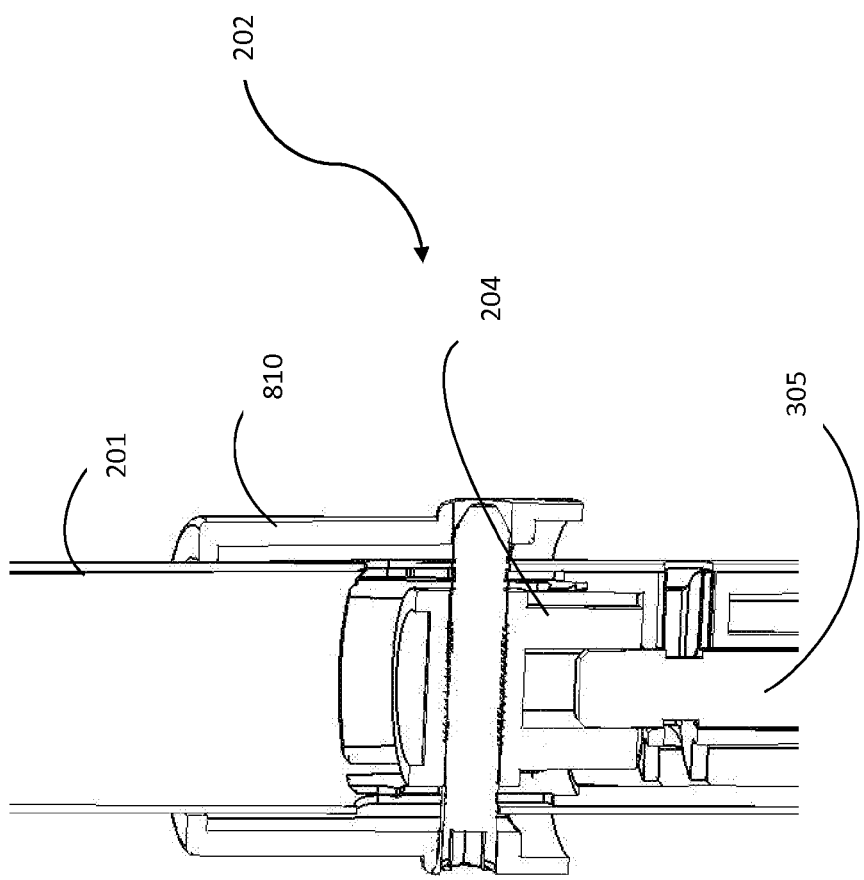
FIG. 4B schematically presents the coupling mechanism of FIG. 4A, when the second coupling member and the third coupling member are in their lower position.

FIG. 4B schematically presents the coupling mechanism 202 of FIG. 4A, when the second coupling member and the third coupling member are in their lower position, that is, when the pivot 305 and the steering arm 201 are coupled one to the other.

FIG. 5 is a schematic representation of one example of a pivot's top end 308 in correspondence to the second coupling member's opening 307 (in silhouette). It is illustrated that the pivot's top end in this example has an almost rectangular shape, although for most of its length the pivot is round. The opening has a corresponding shape thereto. Hence, while being inserted into the opening the pivot is affixed inside the second coupling member, i.e., the pivot cannot rotate inside the second coupling member. Moreover, the almost rectangular shape is non-limiting and many other, non round shapes can be used for the purpose of affixing the pivot inside the second coupling member's opening.

Figure 6:
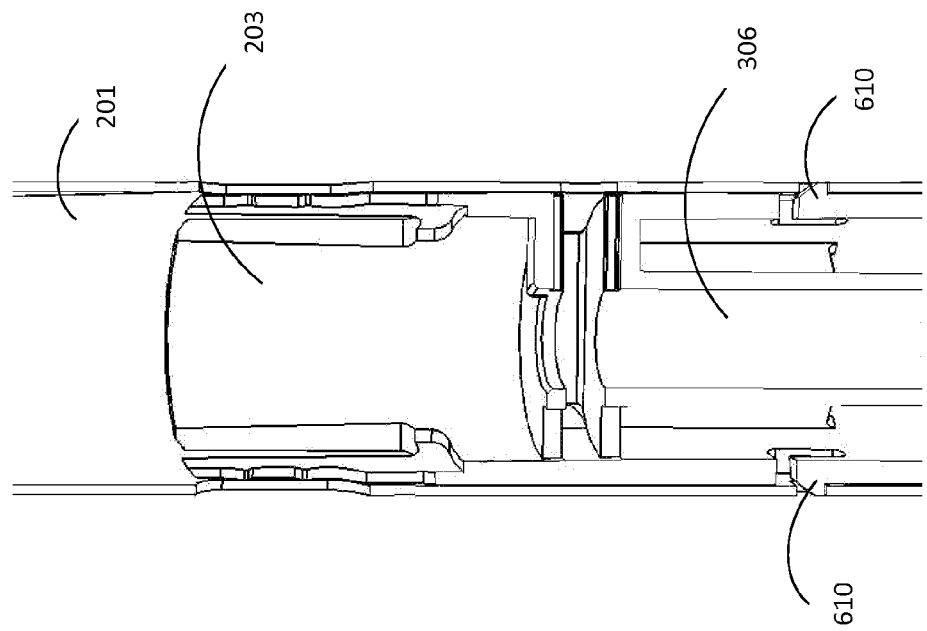
FIG. 6 illustrates how the steering arm holds the first coupling member, according to one embodiment of the invention.

FIG. 6 illustrates how the steering arm 201 holds the first coupling member 203, according to one embodiment of the invention. It can be seen in the figure, that the first coupling member is held by grasping elements 610, such as snaps, in the steering arm's tube. In the presently illustrated example, there are two snaps holding the first coupling element, one of each side, yet this in non-limiting and any other number of snaps can be used, as long as the first coupling member is affixed within the steering arm's tube. In the figure, the shaft 306 can be seen.

Figure 7:
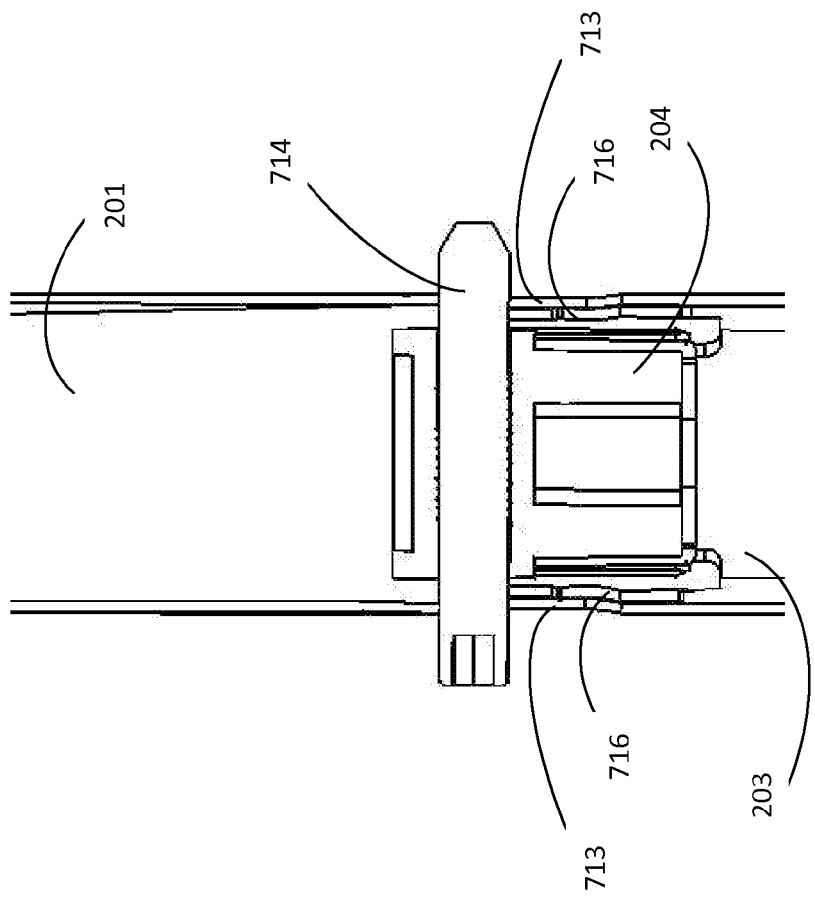
FIG. 7 illustrates how the second coupling member slides inside the first coupling member, according to one embodiment of the invention.

FIG. 7 illustrates how the second coupling member 204 slides inside the first coupling member 203, according to one embodiment of the invention. In the steering arm's tube there may be grooves 713. Through these grooves a guiding element 714, connected to the second coupling member, can slide up and down, thus lifting and lowering, respectively, the second coupling member. The second coupling member should typically stay in a low, down position when coupled to the pivot, and in an upper, high position when disconnected therefrom. According to one embodiment a locking mechanism may be provided by way of protrusions in the groove for locking the second coupling member in a high position. When the guiding element crosses a protrusion, it is locked therebehind. In order to allow crossing of the guiding element, the protrusion should be made of a flexible or resilient material. According to an embodiment a locking mechanism may be provided by way of protrusions in the groove for locking the second coupling member in a low position as well.

Although the steering arm is typically made of a non-flexible material, it is possible to attach thereto another layer of a flexible material, either from the inside or from the outside, forming the protrusion in this flexible layer. In one embodiment, the first coupling member 203, which is attached to the steering arm's tube from the inside, can form this layer. Hence, as illustrated in the figure, grooves are seen also in the first coupling member, wherein the protrusions 716 are implemented therein. This is non-limiting though and instead of using the first coupling member as the flexible layer, other solutions may be provided as a dedicated piece of flexible material which is attached to the steering arm's tube instead. Yet other embodiments may use other solutions, alternative to the protrusions, such as using a screw as the guiding element.

In those cases when the third coupling member includes a knob, as described with reference to FIG. 4A, the guiding element may form also the connecting element 309. Alternatively, a connecting element 309 may exist, which is additional to the guiding element. When the knob is missing, guiding member alone 714 may be the third coupling member.

Figure 8:
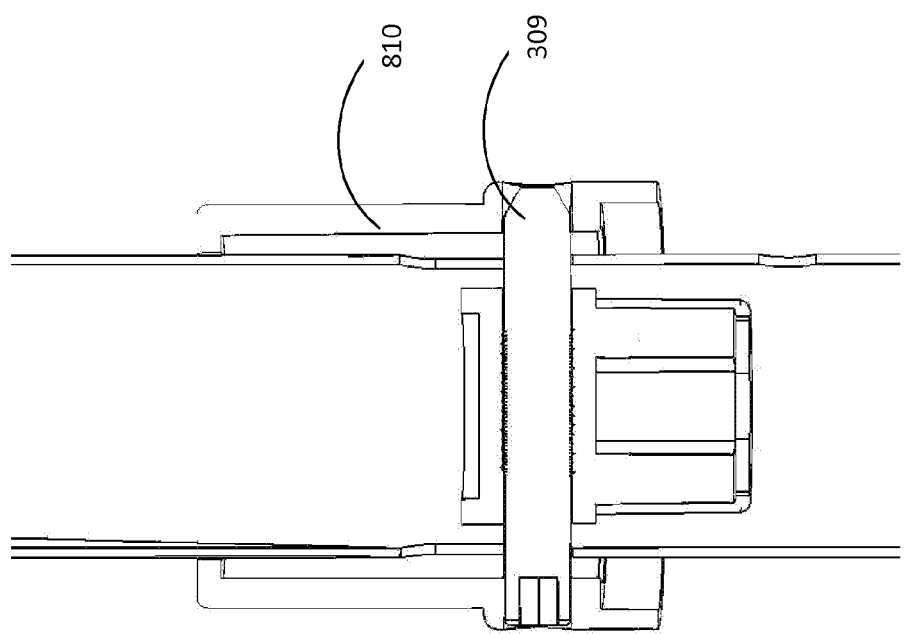
FIG. 8 illustrates a third coupling member having a knob, according to one embodiment of the invention.

FIG. 8 illustrates the third coupling member 810, according to one embodiment of the invention. As was noted above, in this embodiment, the connecting element 309 is the guiding element 714, being able to slide up and down in the groove. The third coupling member 810 may have other shapes and position according to other embodiments.

Figure 9A:
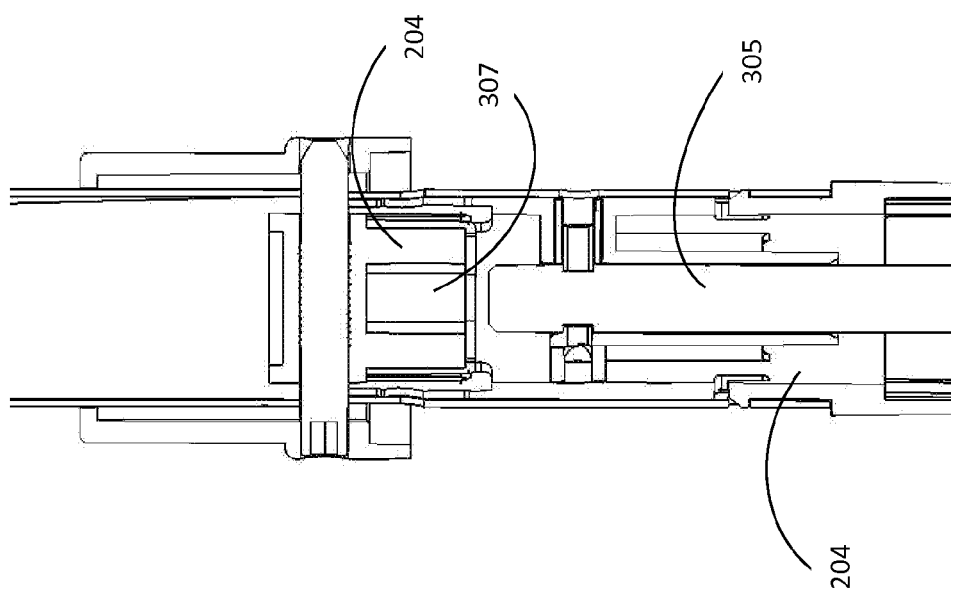
FIGS. 9A and 9B illustrate the coupling mechanism in uncoupled and coupled position, respectively.
Figure 9B:
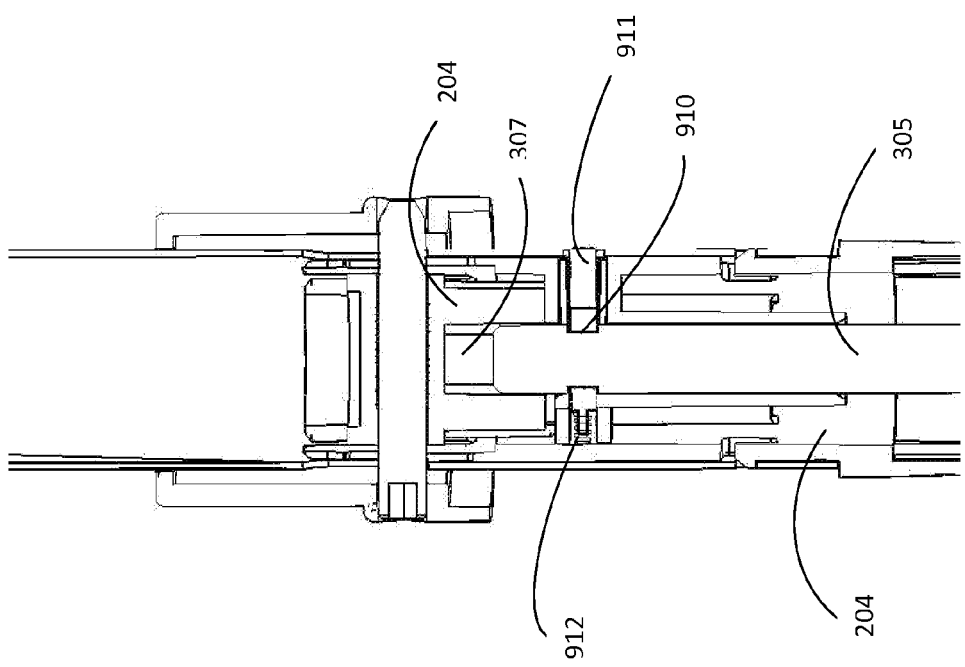

FIG. 9A and 9B illustrate the coupling mechanism in uncoupled and coupled position, respectively. It can be seen, from looking at FIG. 9A that the top end of the pivot 305 is free, that is, it is not inserted into the opening 307 of the second coupling member 204. In FIG. 9B, illustrating the coupled position, the top end of the pivot is inserted into the opening 307.

In each one of the positions described with reference to FIGS. 9A and 9B, the pivot may be affixed corresponding to the first coupling member, without this affixing, the pivot may have been released.

In order to keep the pivot affixed with reference to the first coupling member, the pivot has an indentation 910. A locking member 911 may have a spring 912, clenching the pivot's indentation, which may prevent the pivot from sliding out and releasing therefrom. Therefore, the locking member 911 may prevent uncoupling of the pivot and the coupling mechanism.

Figure 10:
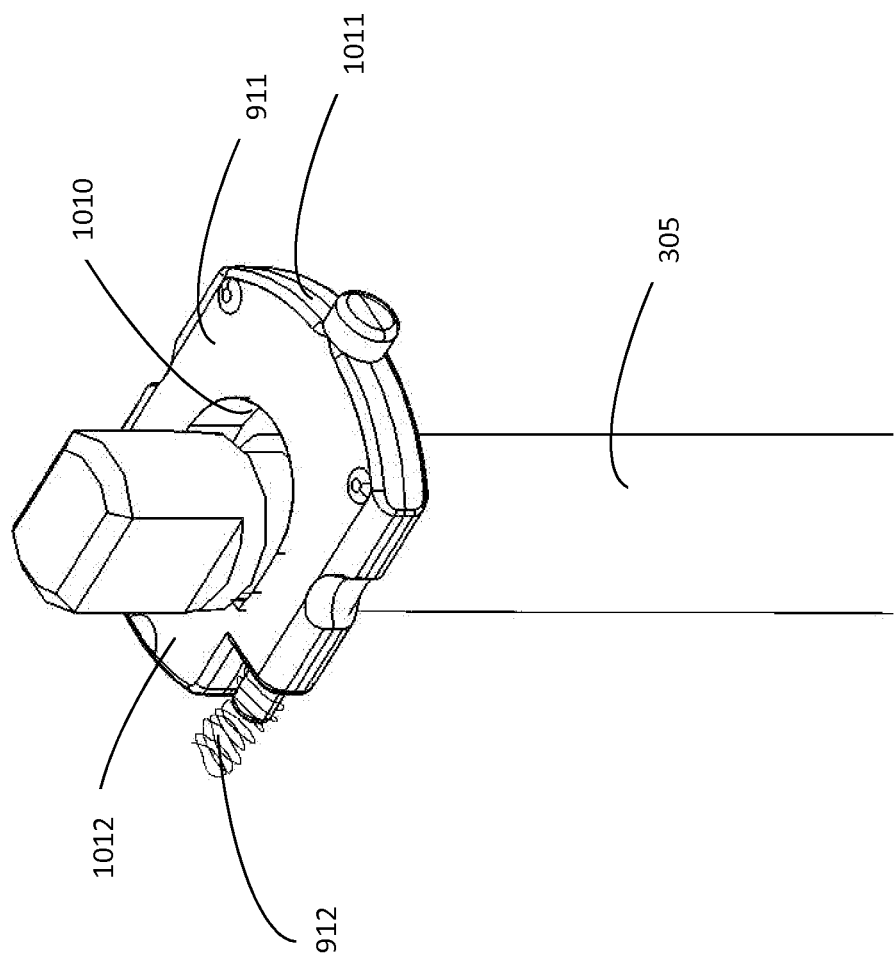
FIG. 10 illustrates a locking member, according to one embodiment of the invention.

FIG. 10 illustrates a locking member 911, according to one embodiment of the invention. The locking member, in this case, has an oval opening 1010 through which the pivot 305 can pass, and one or more springs 912. The locking member 911 has a first side 1011 and a second side 1012. It is noted though that the locking member is not necessarily rectangular and it may not have definable sides. However, for the sake of brevity, the embodiment illustrated is nearly rectangular in shape.

When inserted into the steering arm's tube, or into the first coupling member, the spring/springs push the locking member towards its 1011 side, against the tube's wall. Upon inserting the pivot into the shaft 306 of the first coupling member, the pivot reaches the locking member. Then, the top of the pivot's end pushes the locking mechanism towards the 1012 side. When the pivot's indentation reaches the locking mechanism, the spring/springs are slightly released and push the mechanism into the indentation, thus affixing the pivot in correspondence to the locking mechanism and hence also in correspondence with the first coupling member.

The mechanism illustrated in FIG. 10 is non-limiting and many other one-time locking mechanisms known per se may be used alternatively, as applicable.

In one embodiment, the coupling mechanism 202 may be in the front tube 106 of the frame 105. In other embodiments, the coupling mechanism may appear on top of the front tube.

Figure 11:
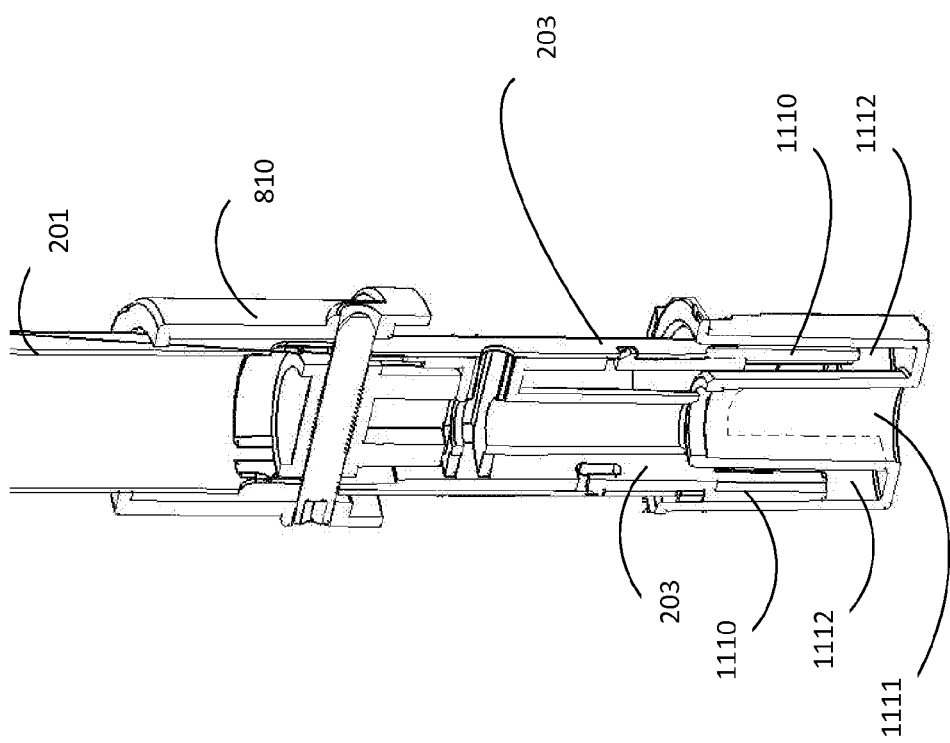
FIG. 11 illustrates a restricting mechanism for restricting the turning angle of the handlebars, according to one embodiment of the invention.

Attention is drawn now to the steering arm, whose turning angle is restricted due to safety considerations, protecting the body of the rider from being hit by the handlebars 115. It should be appreciated that the restricting mechanism illustrated below can restrict the turning to a certain limit, e.g., to substantially 30°. However, this is non-limiting and other embodiments may restrict the turning angle by some other measure. Other turning angles such as 60° are possible as well. According to one embodiment of the invention illustrated in FIG. 11, the restricting mechanism may be partially assembled into the coupling mechanism 202, for example, into the first coupling member 203. In this example, two projections 1110 on the bottom end of the first coupling member 203, which is affixed inside the steering arm 201, may slide and rotate in two grooves 1112 in a restricting element 1111. The restricting element is affixed to the tricycle's frame or body.

Upon turning the handlebars, the steering arm turns therewith, and hence the first coupling member turns as well, together with the projections 1110. When the projections reach any one of the groove's ends, it cannot continue sliding. Because the restricting element is affixed to the frame or body of the tricycle, the turning angle of the handlebars with respect to the tricycle's body is restricted by the angle of the grooves.

In other embodiments, though, the restricting mechanism can be disconnected from the coupling mechanism. For example, an element resembling restricting element 1111 can be affixed with reference to the tricycle's frame or body. Another element, having two projections, can be affixed to the steering arm, below the first coupling element. Furthermore, this is non-limiting as well and in other embodiments, instead of having two projections, it is possible to use only a single projection of even more than two projections. That is, in order to restrict the turning of the steering arm (and hence of the handlebars 115), at least one projection may be utilized.

In some embodiments of the invention the restricting mechanism can be closed within a "cover sphere", constituting also "cover body" or "enclosure", whose shape can very as applicable. It is appreciated that together with the restricting mechanism the enclosure may and may not cover also the coupling mechanism.

When the steering arm and pivot are coupled the pivot becomes a direct continuation of the steering arm, allowing the front wheel to be controlled by the handlebars connected to the steering arm ("rider-steerable mode"). When the steering arm and the pivot are uncoupled, the pivot may swivel freely inside the first coupling member. Hence, the front wheel becomes a caster that aligns itself to a direction in which the tricycle is pushed or pulled ("externally-steerable mode").

Figure 12:
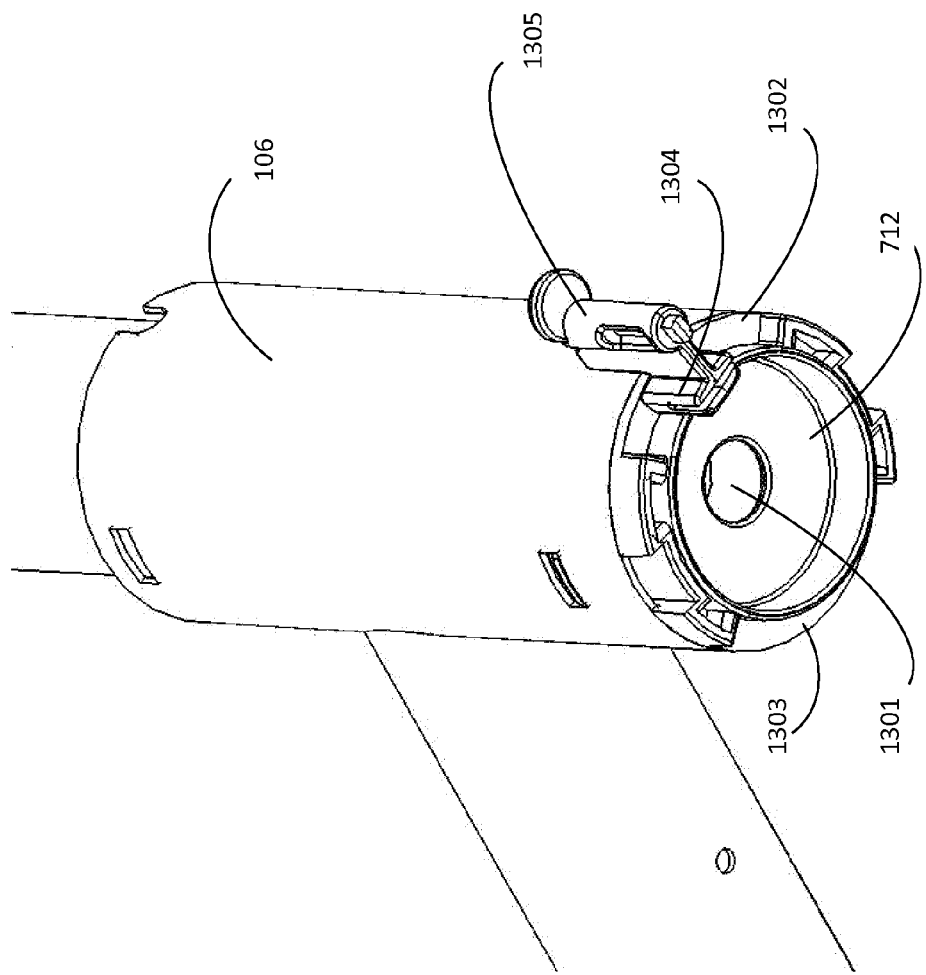
FIG. 12 graphically depicts a rotation restricting mechanism, according to one embodiment of the invention.

FIG. 12 graphically depicts a rotation restricting mechanism 712, according to one embodiment of the invention. The figure depicts a bottom end of the front tube 106. An opening 1301 is illustrated; the pivot 305 can pass therethrough. In addition, two recessed members, for example, grooves 1302 and 1303 are shown, and a guide 1304. Basically, the guide can rotate around the front tube, e.g. the combined guide and recessed members constitute a bearing. However, its rotation is limited by the ends of the grooves. That is, the guide can slide in the groove as long as it does not reach the groove's end, when sliding is stopped. Hence, appreciating that the guide is directly or indirectly coupled to the front wheel being non-rotationally fixed thereto, it can be understood that the guide, as well as the wheel can rotate, as long as the guide does not reach the grooves' end. The front wheel's rotation is restricted, then, to the angle between the grooves' ends, that is, to the angle of the groove's arch or to the angular section. Therefore, as the groove's angle becomes wider, the wheel will have higher freedom to rotate. Indeed, in the figure two grooves are depicted, namely 1302 and 1303, while it can be appreciated that 1303 is of a wider angle. Therefore, by placing the guide in 1303 instead of 1302, it can be appreciated that the front wheel will have more freedom to rotate, compared to placing the guide in 1302. The grooves may have different angles according to the needs and requirements.

A pressure transferring element 1305, also depicted by the figure, may be coupled to the guide 1304. Hereinafter due to readability considerations, a push button is described. However it should be appreciated that the invention is not limited to buttons and other pressure transferring elements can be used. That is, a button is only a non-limiting example to any pressure transferring element applicable to the case. The button's operation shall be described with reference to FIG. 13 below.

Figure 13:
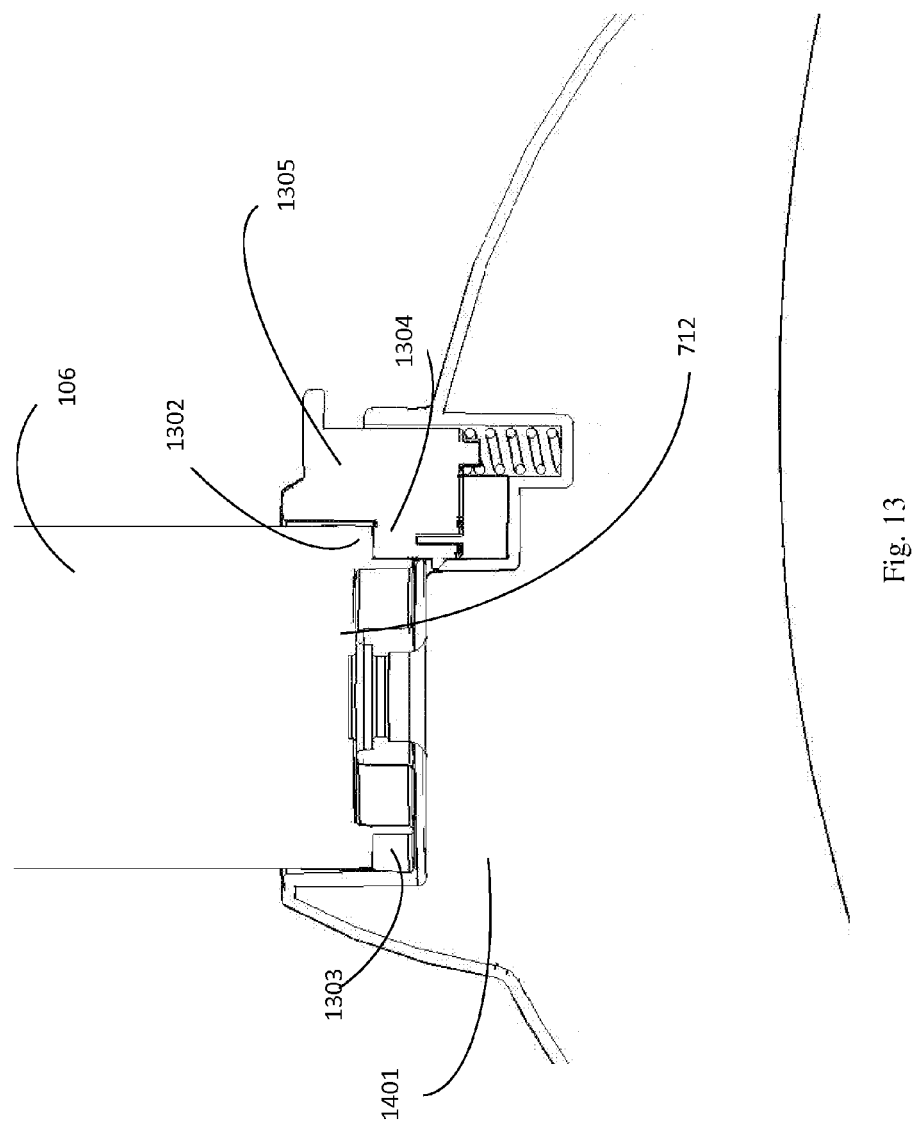
FIG. 13 schematically represents a vertical section of a supporting structure holding the rotation restricting mechanism at the bottom of the front tube, according to one embodiment of the invention.

FIG. 13 schematically represents a vertical section of a supporting structure 1401 holding the rotation restricting mechanism 712 at the bottom of the front tube 106, according to one embodiment of the invention. The figure illustrates grooves 1302 and 1303, as well as guide 1304 and knob 1305. It can be seen that the knob is engaged to the supporting structure 1401, while it is coupled thereto via a spring 1401. Furthermore, the button may be stably, non-rotationally positioned with reference to the supporting structure and when the supporting structure rotates around the front tube, the button rotates therewith.

Upon pressing the button 1305 down, while pushing the spring, the guide 1304 is lowered and released from the groove. The supporting structure 1401 can be fully rotated then, as the grove's ends restrict neither the guide's sliding nor the supporting structure's rotation. However, upon rotating, the guide may reach again one of the grooves. It can be appreciated then, that without forcing pressure on the button 1305, the spring will push the button up, reinserting the guide back into a groove. The groove into which the guide is reinserted can be either groove 1302 or groove 1303, depending on how the supporting structure 1401 had rotated prior to reinserting the guide.

By pressing the button and intentionally rotating the supporting structure so as to release the guide in the other groove, it is possible to rotate the supporting element as well as the wheel the supporting element is fixed thereto, that is, the front wheel.

It is noted though that the illustrated embodiment is non-limiting and alternatives exist. One such alternative, for example, does not require a spring, which the button is fixed to its place, e.g., by means of a snap, then it can be released, and re-fixed.

It was mentioned before, with reference to FIG. 12, that in the presently described example the groove 1303 is of wider angle compared to groove 1302. Hence it can be understood that if, further to the button's release, the guide is inserted into groove 1303 instead of groove 1302, the supporting structure 1401 may have more freedom to rotate around the front tube 106, compared to inserting the guide into groove 1302. It is appreciated now though that should there have been one groove all around the bottom of the front tube, the supporting structure could have been rotating freely around the front tube, without restriction.

Further to understanding one mechanism for rotating the front wheel around the front tube, with or without restriction, it should be considered that according to certain embodiments, the supporting structure may be non-rotationally joined to the wheel assembly 108, either inside a mud shield 301, or as a stand alone structure, e.g., directly coupled to the pivot 305 or to the fork 304, or in other way applicable to the case. Hence, the supporting structure 1401 is oriented parallel to the front wheel 102 while it is configured to rotate around the front tube 106 with or without restriction.

Since the uncoupling the steering arm from the pivot leads to swiveling of the wheel thus allowing externally-steerable mode, and in order to protect the rider's safety, certain embodiment of the invention apply rotation restrictions to the front wheel, for example the mechanism described with reference to FIGS. 12 and 13.

Further to describing the operation and mechanisms characterizing the steering assembly 107 and wheel assembly 108, attention is re-drawn now to FIG. 1, where it is mentioned that the tricycle according to the invention is configured for coupling to a cart, that can be used as an external steering device, that is, as a handle pushing and steering the tricycle.

The present invention has been described with a certain degree of particularity, but those versed in the art will readily appreciate that various alterations and modifications may be carried out, without departing from the scope of the following claims.

The invention claimed is:

1. A tricycle having a cart, comprising:
a riding module comprising:
 a front wheel having a front wheel axis;
 a pair of pedals, each pedal configured to rotate said front wheel;
 a head tube;
 two non-continuing recessed members, each in the form of an arch having two ends, substantially in a perimeter of said head tube;
 a guide configured to rotate within said recessed members and which is limited by said two ends of each recessed member;
 a pressure transferring element, coupled to said guide, for pushing said guide into one of said recessed members;
 a seat;
 a frame, configured to support said seat, and to support said head tube;
 a fork, having a stem, and having at least one blade configured to support said front wheel in a manner permitting said front wheel to rotate about said front wheel axis;
 a steering assembly, having a rider handle, configured to turn said fork about a stem axis, said rider handle, having a rider steerable mode, being configured to be rotationally coupled with said stem in a manner permitting a tricycle rider to exert forces on said rider handle and thereby turn said fork, and said rider handle having an external steerable mode, being configured to be rotationally uncoupled from said stem, preventing forces on said rider handle from turning said fork; and
a cart module comprising:
 two wheels;
 a parental handle for moving said cart module;
 a body configured to carry a bag;
 a base having a base frame; and
 an attaching assembly capable of coupling to said riding module.

2. The tricycle of claim 1 wherein the cart module is foldable.

3. The tricycle of claim 1 wherein the cart module can be disconnected from said riding module.

4. The tricycle of claim 3 wherein the disconnected cart is carryable.

5. The tricycle of claim 1, wherein the fork includes two blades configured to rotatably support the front wheel therebetween.

6. The tricycle of claim 1, wherein the rider handle is configured to be uncoupled from the stem via a manually activatable release mechanism.

7. The tricycle of claim 6, wherein the rider handle is configured to be coupled to the stem via a snap-in-place mechanism.

8. The tricycle of claim 1, further comprising a coupling mechanism for permitting an operator to selectively couple and uncouple a rotational connection between the rider handle and the stem.

9. The tricycle of claim 8, wherein the coupling mechanism is configured such that in the external steerable mode, the rider handle is freely rotatable independent of the stem, and in the rider steerable mode the rider handle is coupled to the stem for rotation with the stem.

10. The tricycle of claim 1, wherein the stem has a minimum diameter that is at least three times smaller than a width of the front wheel.

* * * * *